United States Patent [19]

Hermens et al.

[11] Patent Number: 4,496,842

[45] Date of Patent: Jan. 29, 1985

[54] RADIATION DETECTOR

[75] Inventors: Joannes L. G. Hermens; Matheus W. Kerkhof, both of Eindhoven, Netherlands

[73] Assignee: U.S. Philips Corporation, New York, N.Y.

[21] Appl. No.: 443,406

[22] Filed: Nov. 22, 1982

[30] Foreign Application Priority Data

Nov. 26, 1981 [NL] Netherlands ........................ 8105349

[51] Int. Cl.[3] ................................................ G01T 1/18

[52] U.S. Cl. .................................... 250/385; 250/367

[58] Field of Search ................... 250/374, 385, 361 R, 250/363 R, 363 S, 366, 367

[56] References Cited

U.S. PATENT DOCUMENTS

| | | | |
|---|---|---|---|
| 4,031,396 | 6/1977 | Whetten et al. | 250/385 |
| 4,345,155 | 8/1982 | Allemand et al. | 250/385 |

*Primary Examiner*—Janice A. Howell
*Attorney, Agent, or Firm*—Paul R. Miller

[57] ABSTRACT

A radiation detector is assembled using spacers which contact one another through apertures in the electrode plates of the detector, so that the relevant thickness dimension of the dimensionally accurate spacers determines the spacing of the plates. Thickness variations of the plates can be compensated for at a supporting surface of the spacers being provided with depressable raised portions. The plates may be constructed as laminations for collimator beyond which a radiation-sensitive element is arranged, and can also form electrode plates for a gas ionization detector.

17 Claims, 6 Drawing Figures

RADIATION DETECTOR

Figure 1:
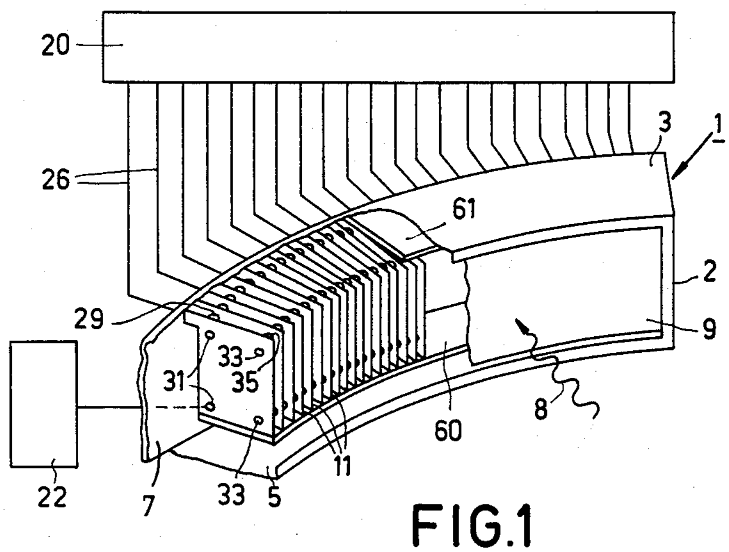

The invention relates to a radiation detector including a plurality of plates which are mounted at a distance from one another by means of intermediate pieces.

Such a radiation detector in the form of a gas ionization X-ray detector for an X-ray scanner is known from U.S. Pat. No. 4,031,396; therein, the electrode plates are maintained at a distance from one another in the detector by stacking the plates on tensioning bolts with intermediate pieces.

In high-resolution detectors, that is to say detectors in which a small distance exists between individual electrodes, it is difficult to prevent undesirable variations in the spacing of the plates.

It is an object of the present invention to provide a radiation detector in which the spacing between the plates is very accurately maintained, notably between the electrodes of a gas-filled X-ray detector.

To achieve this, a radiation detector of the kind set forth in accordance with the invention is characterized in that the intermediate pieces are formed by spacers which are mounted so that they contact one another through apertures in the plates.

Because the spacing of the electrode plates in a detector in accordance with the invention is determined entirely by a relevant thickness dimension of the spacers, undesired variations in the spacing can be minimized by using spacers having a very high dimensional accuracy. Moreover, the consulative effect of the individual thickness variations of the constituent components, notably of the electrode plates, will be reduced.

In a preferred embodiment, the spacers fit in the apertures of the electrode plates with a light clamping fit, so that during assembly each of the plates is first provided with preferably four spacers which form a unitary assembly therewith during further assembly. Moreover, successive spacers preferably mate with a snap connection effect, so that a coherent unit is obtained by stacking the electrode plates. In order to compensate for thickness variations as between the electrode plates and to eliminate the effect thereof on the spacing of the plates, a supporting surface of the spacers in a preferred embdodiment is provided with raised portions which respectively press the plates against a flat supporting surface of a preceding spacer. Depression of these raised portions is facilitated by a special shape of the spacers. For assembling a focusing detector, use is made of spacers of different thickness which preferably are of a different color to provide a visual distinction. Similarly, spacers of different thickness can be used in order to realize desired variations in the spacing between the electrodes. The spacers also can be used for assembling a radiation collimator comprising radiation opaque laminations beyond which, with respect to the radiation source, a scintillation detecting device is placed.

Figure 2A:
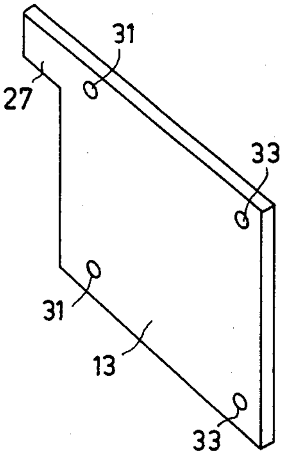
Figure 2B:
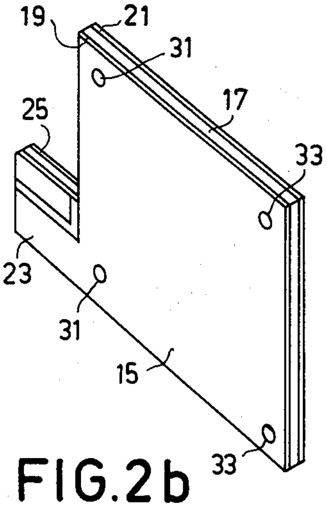
Figure 3A:
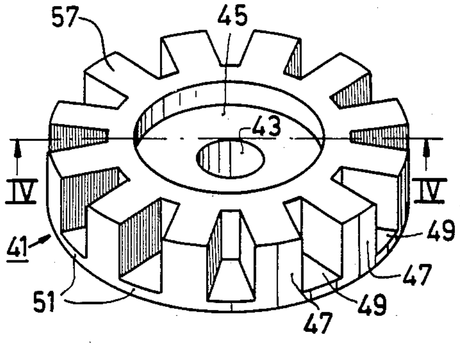

Some preferred embodiments of detectors in accordance with the invention will be described in detail hereinafter with reference to the drawing. Therein:

FIG. 1 shows a detector in accordance with the invention which is suitable for use in an X-ray scanner;

FIGS. 2*a* and 2*b* show electrode plates for such a detector;

FIGS. 3*a* and *b* show a spacer for such a detector, and

Figure 4:
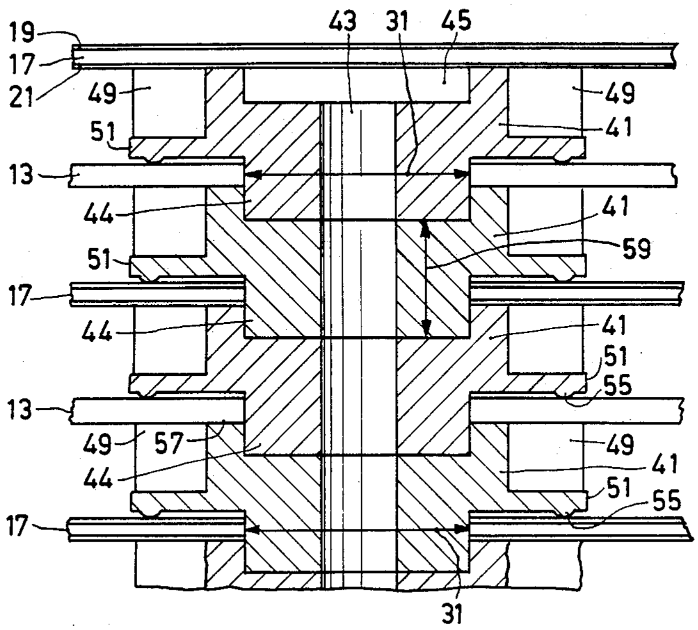

FIG. 4 is a sectional view of a stack of electrode plates and spacers for such a detector.

A multi-channel detector as shown in FIG. 1 comprises a housing 1 with sidewalls 2, an upper wall 3, a lower wall 5, a rear wall 7, an entrance window 9 which is transparent for the radiation 8 to be detected, and a series of electrode plates 11. The electrodes (also shown in FIG. 2) include anodes 13, which are, preferably metal plates, for example, a molybdenum lamination having a thickness of, for example, 0.3 mm, and cathodes 15 which consist of a carrier 17, for example, a printed circuit board, a first cathode 19 and a second cathode 21 from which respective signals can be derived individually, through terminals 23 and 25 and connections 26, by means of a signal read unit 20. By terminals 27, a high voltage can be applied to the anode plates by means of a high-voltage source 22.

Between the electrodes 13 and 15 there are provided spacers 29 which are accommodated (as shown in FIG. 4) in apertures 31 in the electrodes. Each of the electrodes for assembling the detector forms an integral assembly unit with the spacers accommodated in the apertures. For a focusing detector, such as is customarily used in X-ray scanners, the thickness of the spacers 29 inserted in the bores 31 will be different from the thickness of the spacers 35 inserted in the bores 33. The difference in thickness determines the radius of curvature of a detector thus assembled. Similarly, spacers of different thickness can be used when the thickness of the anode plates and the cathode plates are different, and also when assembling a detector having a graded resolution, for example, a resolution which decreases towards the extremities. After stacking the detector, the overall length (measured along a circular arc for a focusing detector) is adjusted to a given value by compression. The mutually equal thickness of the spacers then ensures a mutually equal spacing of the electrode plates. The homogeneity of the detector can then be checked and, in the case of an error, the relevant electrode plate may be individually replaced. Similarly, spacers may be individually exchanged in respect of each electrode plate.

Figure 3B:
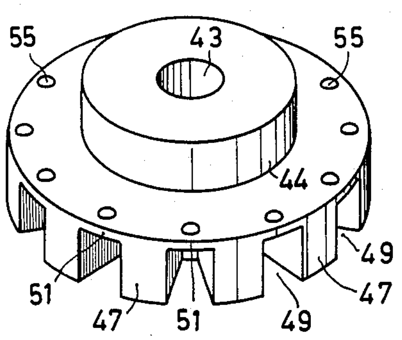

A spacer 41 as shown in FIG. 3 comprises a central bore 43 having a diameter of, for example, 1 mm, and on one side, a cylindrical bush 44 having an outer diameter which is adapted to the apertures 31, 33 in the electrode plates, for example, a diameter of 3 mm. The spacer is provided on its other side with a recess 45 which has a corresponding inner diameter of 3 mm. On the side of the recess 45, the spacer comprises, for example, 12 recesses 49 and 12 teeth 47. The recesses leave a part 51 in place and on this part there are provided raised portions 55. The raised portions have a height of, for example, 0.4 mm and the comparatively thin portions 51 enable the raised portions to be depressed. The height of the raised portions is chosen so that static thickness variations as between the electrode plates can be compensated for. The spacer has an outer diameter of, for example 6 mm and a thickness of, for example 2 mm, so that the spacing of the electrode plates to be mounted is defined as will be apparent from FIG. 4.

FIG. 4 is a sectional view of the electrode plates in the form of anodes 13, and cathodes 19 and 21 provided on printed circuit board 17 with each electrode plate being provided with at least one aperture 31. In each of the apertures there is situated a spacer 41 which is shown in a sectional view taken along the line IV—IV in FIG. 3*a* with each spacer comprising a central bore 43, a cylindrical bush 44, and a cylindrical recess 45. The bush 44 fits in the aperture 31 in the electrode plates and is inserted in the recess 45 of a next spacer with a snap-connection effect. The sectional view of the spacers illustrates the recesses 49 with the portions 51 on which the raised portions 55 are provided. During compression, the raised portions 55 press the electrode plates against supporting surfaces 57 of the spacers and are subsequently depressed into the recess 49. Thus, the distance between the electrode plates is determined only by the thickness dimension 59 of the spacer.

After the checking and any correction of a detector thus stacked, it is connected to a lower support 60 (see FIG. 1) and an upper support 61 by means of adhesive, after which it is arranged in the housing.

For a short-focus detector, that is to say a detector having such a radius of curvature that the fact that the spacers are not wedge-shaped is a drawback, wedge-shaped spacers are preferably used.

The apertures 31 are then formed so that the spacers can be arranged therein in only one rotary position. The aperture 31 in the electrode plates in a preferred embodiment, and hence also the outer boundary of the bush 44, is shaped as an isosceles, non-equilateral triangle.

What is claimed is:

1. A radiation detector comprising a plurality of separated plates, said plates having apertures, and intermediate spacers between each of said plates for separating said plates, said spacers contacting one another through said apertures.

2. A radiation detector according to claim 1, wherein said plates are rectangular, and said apertures are located near corners of said plates.

3. A radiation detector according to claim 1, wherein said spacers are of different thicknesses for said plates in order to form a focusing detector, said different thicknesses being color coded.

4. A radiation detector according to claim 1, wherein each of said spacers is provided with raised portions, said raised portions being depressable.

5. A radiation detector according to claim 1, wherein said plates and spacers are compressed to provide a predetermined overall length.

6. A radiation detector according to claim 1, wherein said plates are radiation opaque laminations, and wherein an element sensitive to radiation to be detected is situated beyond said plates to form a radiation collimator.

7. A radiation detector according to claim 1, wherein said plates are electrode plates, said electrode plates being accommodated in a housing, said housing having a window transparent to radiation to be detected in order to form an ionization radiation detector.

8. A radiation detector according to claim 1, wherein said electrode plates are attached with an adhesive to at least one upper or lower support of said detector.

9. A radiation detector according to claim 1, wherein said spacers are formed with a snap connection to mate successive spacers together through said apertures.

10. A radiation detector according to claim 1, wherein said spacers each include a member having a central bore, a bush at one side of said member, said bush extending through said apertures, and said bore passing through said bush, a central recess at the other side of said member surrounding said bore, and a plurality of separated teeth surrounding said central recess.

11. A radiation detector according to claim 10, wherein said member is cylindrical and said bush is cylindrical.

12. A radiation detector according to claim 10, wherein each of said apertures and said bush are shaped into an isoceles, non-equilateral triangle.

13. A radiation detector according to claim 10, wherein a plurality of depressable raised portions are provided at said one side surrounding said bush.

14. A radiation detector according to claim 13, wherein said raised portions are provided at said one side opposite to the separations between teeth at the other side of said member.

15. A radiation detector according to claim 10, wherein said bush of said members is inserted into said recess of another of said members to form a snap connection.

16. In an X-ray examination apparatus, the improvement comprising a radiation detector including a plurality of separated plates having apertures; and intermediate spacers between each of said plates for separating said plates, said spacers contacting one another through said apertures.

17. An a scintillation detection apparatus, the improvement comprising a radiation detector including a plurality of separated plates having apertures; and intermediate spacers between each of said plates for separating said plates, said spacers contacting one another through said apertures.

* * * * *

UNITED STATES PATENT AND TRADEMARK OFFICE

CERTIFICATE OF CORRECTION

PATENT NO. : 4,496,842

DATED : January 29, 1985

INVENTOR(S) : Joannes L. G. Hermens; Matheus W. Kerkhof

It is certified that error appears in the above—identified patent and that said Letters Patent is hereby corrected as shown below:

Claim 17, Line 1, change
"An" to --In--

Signed and Sealed this

*Fifteenth* Day of *October 1985*

[SEAL]

*Attest:*

DONALD J. QUIGG

*Attesting Officer*

*Commissioner of Patents and Trademarks—Designate*